United States Patent [19]

Kaul

[11] Patent Number: 4,540,775
[45] Date of Patent: Sep. 10, 1985

[54] 1,4-DI-[2'-(2",4"-DICHLORO-PHENYLAZO)ACETOACETAMIDO]-2,5-DIMETHYLBENZENE

[75] Inventor: Bansi L. Kaul, Biel-Benken, Switzerland

[73] Assignee: Sandoz Ltd., Basel, Switzerland

[21] Appl. No.: 262,790

[22] Filed: May 11, 1981

Related U.S. Application Data

[63] Continuation of Ser. No. 92,462, Nov. 8, 1979, abandoned.

[30] Foreign Application Priority Data

Nov. 14, 1978 [CH] Switzerland ........................ 11691/78

[51] Int. Cl.³ .................. C09B 33/153; C09B 35/035; D06P 1/44; D06P 1/50
[52] U.S. Cl. ...................................... 534/575; 8/437; 8/506; 8/508; 8/513; 8/514; 8/518; 8/519; 106/23; 106/288 Q; 106/308 Q; 162/162; 524/190; 534/748
[58] Field of Search ................. 260/176; 534/748, 575; 8/437, 506, 508, 513, 514, 518, 519; 162/162; 524/198

[56] References Cited

U.S. PATENT DOCUMENTS

| | | | |
|---|---|---|---|
| 3,413,279 | 11/1968 | Mueller | 260/176 |
| 3,872,078 | 3/1975 | Cseh et al. | 260/176 |
| 3,974,136 | 8/1976 | Hunger et al. | 260/176 |
| 3,991,044 | 11/1976 | Conley | 260/176 |
| 4,048,152 | 9/1977 | Ribka et al. | 260/176 |
| 4,065,449 | 12/1977 | Cseh | 260/176 |
| 4,081,439 | 3/1978 | Hari et al. | 260/176 |

FOREIGN PATENT DOCUMENTS

| | | | |
|---|---|---|---|
| 7400481 | 7/1974 | Netherlands | 260/176 |
| 1164230 | 9/1969 | United Kingdom | 260/176 |
| 1396526 | 6/1975 | United Kingdom | 260/176 |
| 1400533 | 7/1975 | United Kingdom | 260/176 |
| 1404348 | 8/1975 | United Kingdom | 260/176 |
| 1416855 | 12/1975 | United Kingdom | 260/176 |
| 1456331 | 11/1976 | United Kingdom | 260/176 |
| 1475220 | 6/1977 | United Kingdom | 260/176 |

Primary Examiner—Floyd D. Higel
Attorney, Agent, or Firm—Gerald D. Sharkin; Richard E. Vila; Melvyn M. Kassenoff

[57] ABSTRACT

The compound of the formula,

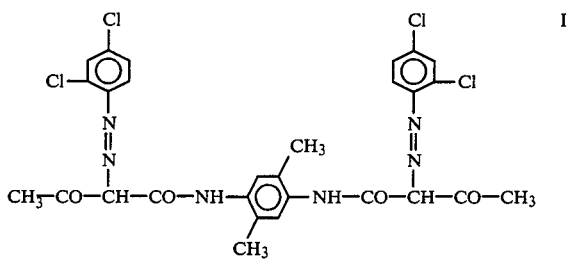

a pigment existing in a yellow (α) modification and an orange (β) modification, the latter being obtained by treatment of the α form with boiling organic solvents, is useful for the mass pigmenting of synthetic plastics and resins, free from or containing solvents, such as viscose, cellulose acetate, polyethylene, polystyrene, polyvinyl chloride and synthetic leathers and rubbers, of surface coatings such as paints and lacquers and of inks and for pigment printing, textile coating and pigmenting paper in the mass.

4 Claims, No Drawings

1,4-DI-[2'-(2'',4'''-DICHLORO-PHENYLAZO)ACETOACETAMIDO]-2,5-DIMETHYLBENZENE

This application is a continuation of application Ser. No. 92,462, filed Nov. 8, 1979, and now abandoned.

The present invention provides the compound of formula I

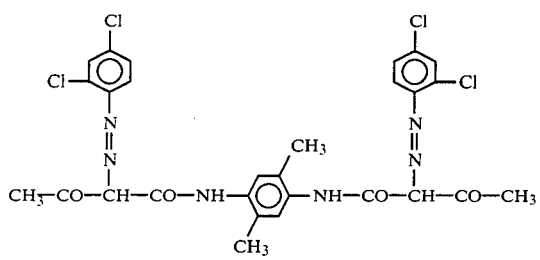

useful as a pigment, and a process for its production by diazotising 2 moles of 2,4-dichloroaniline and coupling of the diazonium salt with 1 mole of 1,4-bis-(acetoacetylamino)-2,5-dimethylbenzene. The starting materials are known and the reaction is carried out in conventional manner, whereby the product is obtained in the form of fine crystals.

The compound of formula I exists in two distinct solid forms, a yellow form (the α-modification) and an orange form (the β-modification). The product obtained directly from diazo coupling is generally a mixture of the α- and β-forms, and although this is initially orange in colour, the orange pigmentations obtained using such a mixture, e.g. in polyvinyl chloride, are not colour-stable on heating and tend to become yellow, for example on heating to 180° C. for 30 minutes.

By careful choice of conditions for the diazo coupling reaction, it is possible to obtain directly the pure α-form as a yellow powder, the yellow pigmentations of which in PVC are heat-stable. However, it is found that when either the pure α-form or a mixture of α- and β-forms is treated with hot water or a hot organic solvent, the pure β-form may be obtained. This β-form gives orange pigmentations in PVC which do not become yellow on heating. It is surprising that the compound of formula I exists in an orange form, since positional isomers exist only in a single, yellow form.

Suitable solvents for the production of the β-form are, for example, ethanol, glycol, glycol ethers, acetic acid, benzene, nitrobenzene, toluene, formamide and dialkylformamides. Preferably the pigment is treated at the boiling point with a solvent boiling between 70° C. and 170° C. for ½ to 24 hours and subsequently milled. Alternatively, the pigment may be suspended in water at 90°–100° C. for at least 16 hours.

The two modifications of the compound of formula I may be distinguished by their X-ray diffraction spectra. Table 1 shows the interplanar spacing (d-values) in Angstrom units of the observed lines in the X-ray diffraction spectrum, as measured by a Guinier/De Wolff camera using CuK$_\alpha$ radiation. The intensity of the lines was estimated visually on a 4 step scale: strong (s), medium (m), weak (w) and very weak (vw). A diffuse line is indicated by the letter D.

TABLE 1

| α-modification | | β-modification | |
| --- | --- | --- | --- |
| d-value (Å) | intensity | d-value (Å) | intensity |
| 9.25 | w D | 9.0 | w |
|  |  | 8.25 | vw D |
| 4.60 | w | 7.40 | vw D |
| 3.30 | w D | 5.60 | w D |
|  |  | 4.60 | vw D |
|  |  | 4.35 | vw D |
|  |  | 3.86 | w D |
|  |  | 3.76 | w D |
|  |  | 3.68 | vw D |
|  |  | 3.56 | vw D |
|  |  | 3.26 | s |
|  |  | 2.80 | vw |
|  |  | 2.65 | w D |

The fact that the α-form shows only three weak, diffuse lines indicates that it is largely amorphous, whereas the β-form is more crystalline.

The compound of formula I, in either modification or as a mixture of both, is useful as a pigment suitable for the mass pigmenting of synthetic plastics and resins, free from or containing solvents, e.g. viscose, cellulose acetate, polyethylene, polystyrene, polyvinyl chloride and synthetic leathers and rubbers, of surface coatings, such as paints, whether of an oil or water base, lacquers and inks. It may also be used in pigment printing, textile coating and for pigmenting paper in the mass. It may be employed for such uses in conventional manner and in conventional amounts. It is particularly useful in the pigmentation of paints and lacquers, for which purpose the instability to heat of mixtures of the α- and β-form is of lesser importance.

The pigmentations obtained using the compound of formula I have notably good fastness properties, particularly fastness to light and to migration. It is found, however, that the fastness properties of the orange β-form are superior to those of the yellow α-form or of the yellow or orange mixtures of the two forms.

The following Examples, in which parts are by weight and temperatures are in degrees Centigrade, illustrate the invention.

EXAMPLE 1

Preparation of mixture of α- and β-forms 32.4 Parts 2,4-dichloroaniline are heated to 80° in a mixture of 185 parts water and 100 parts conc. hydrochloric acid and allowed to cool under stirring for 10 hours. The solution is stirred with 60 parts ice and diazotised at 0°–5° with 15 parts sodium nitrite in 50 parts water. The resulting diazonium salt solution is added over 3 hours to a stirred suspension of 30.4 parts 1,4-bis(acetoacetylamino)-2,5-dimethylbenzene in 200 parts water, 50 parts 30% caustic soda and 6 parts of a commercial surfactant, which has been adjusted to pH 6 with approximately 35 parts glacial acetic acid and held at 20°–22°. The mixture is stirred for 2 hours at 20°, then 1 hour at 30°; the precipitate is filtered off, washed with hot water until free of salt and dried to give the compound of formula I as a yellowish orange powder.

EXAMPLE 2

Preparation of α-form

A mixture of 32.4 parts 2,4-dichloroaniline, 185 parts water and 85 parts 30% hydrochloric acid is stirred at 90° until a clear solution is obtained (approx. 30 minutes). The solution is cooled to room temperature, whereupon the hydrochloride separates as a grey precipitate. The mixture is stirred for 12 hours, 60 parts ice are added, then 52 parts 4N sodium nitrite are added over 5 minutes, keeping the temperature at 0°–5°. The precipitate slowly dissolves under stirring, and the mixture is stirred for a further hour, with cooling to 0°–5°, in the presence of a detectable excess of nitrous acid. Finally the excess nitrous acid is destroyed with 5 parts 1N amidosulphonic acid, and the mixture is filtered through 2 parts Hyflo-Supercel.

30.4 Parts 1,4-bis(acetoacetylamino)-2,5-dimethylbenzene are dissolved in 250 parts water and 70 parts 30% caustic soda, filtered through 2 parts Hyflo-Supercel, added to a solution of 45 parts glacial acetic acid and 6 parts of a commercial surfactant in 250 parts water, and cooled to 0°–5°. To this solution the cold diazonium salt solution is added dropwise with stirring over 6–7 hours, and the resulting mixture stirred, without further cooling, for another 12 hours. The solid pigment dyestuff is filtered off, washed with 3 liters water at 70° and dried in a vacuum oven at 70°, giving the α-modification of the compound of formula I as a yellow powder.

EXAMPLE 3

Preparation of β-form

The dried product of Example 1 or Example 2 is treated with boiling dimethylformamide for 1 hour, filtered and ground in a ball mill to give a fine orange powder of the β-modification of the compound of formula I.

Instead of treating the dried pigment in an organic solvent, the aqueous reaction product of the coupling reaction may be heated to 90° for 16 hours with stirring, and the solid product washed and dried to give the β-modification.

Application Example A

A mixture consisting of
63 parts polyvinyl chloride emulsion
32 parts dioctyl phthalate
3 parts commercial epoxy softener
1.5 parts commercial stabilizer (barium/cadmium stearate)
0.5 parts commercial chelating agent
is pigmented by mixing with 0.5 parts of the product of Example 3 and 5 parts titanium dioxide pigment.

The mixture is blended in a 2-roll blender mill (one roll at 20 rpm, the other at 25 rpm) for 8 minutes at 160°, and pulled off as a film 0.3 mm thick, having an orange colour.

Application Example B

Four parts of the pigment as used in the preceding Example are added to 96 parts of a mixture of
50 parts of a 60% solution of coco aldehydemelamine resin of 32% fat content in xylene,
30 parts of a 50% melamine resin solution in butanol,
10 parts of xylene and
10 parts of ethylene glycol monoethylether
and the mixture ground for 24 hours in a ball mill. The dispersion obtained is sprayed on aluminum sheet, the spray coating allowed to dry in the air for 30 minutes and then stoved for 30 minutes at 120°. A brilliant orange film with very good light and weathering fastness is obtained.

What is claimed is:

1. The compound of the formula

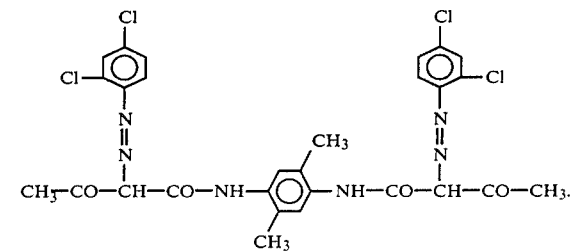

2. The β-form of the compound according to claim 1 having the formula

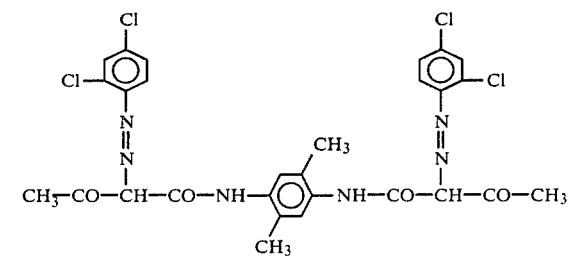

said β-form being characterized by giving orange pigmentations in polyvinyl chloride which do not change color on heating to 180° C. for 30 minutes and by having an X-ray diffraction spectrum (CuK$_\alpha$ radiation) exhibiting lines at d-values of 9.0, 8.25, 7.40, 5.60, 4.60, 4.35, 3.86, 3.76, 3.68, 3.56, 3.26, 2.80 and 2.65 Å.

3. A polymeric material containing, as a pigmenting agent, the β-form of the compound of the formula

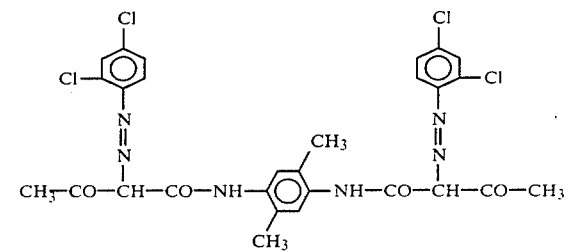

said β-form being characterized by giving orange pigmentations in polyvinyl chloride which do not change color on heating to 180° C. for 30 minutes and by having an X-ray diffraction spectrum (CuK$_\alpha$ radiation) exhibiting lines at d-values of 9.0, 8.25, 7.40, 5.60, 4.60, 4.35, 3.86, 3.76, 3.68, 3.56, 3.26, 2.80 and 2.65 Å., said pigmenting agent being present in an amount sufficient to impart the desired shade to the polymeric material.

4. A polymeric material according to claim 3, said polymeric material being viscose, cellulose acetate, polyethylene, polystyrene or polyvinyl chloride.

* * * * *